United States Patent [19]
Losser

[11] Patent Number: 5,311,662
[45] Date of Patent: May 17, 1994

[54] PRESS METERING APPARATUS AND METHOD

[75] Inventor: Gerald L. Losser, Gloucester, Va.

[73] Assignee: Siemens Automotive L.P., Auburn Hills, Mich.

[21] Appl. No.: 872,229

[22] Filed: Apr. 22, 1992

[51] Int. Cl.$^5$ .................. B23Q 15/00; B23P 19/02; F02M 65/00

[52] U.S. Cl. .................. 29/890.124; 29/407; 29/525; 29/705; 29/720; 73/119 A; 73/861.42

[58] Field of Search ............... 29/407, 525, 705, 720, 29/890.124; 73/119 A, 196, 861, 861.42, 865.9; 239/533.12; 123/470, 531

[56] References Cited

U.S. PATENT DOCUMENTS

| | | | |
|---|---|---|---|
| 3,880,605 | 4/1975 | Webster | 29/407 |
| 4,011,650 | 3/1977 | Granada | 29/407 X |
| 4,100,666 | 7/1978 | Payne | 29/407 |
| 4,152,932 | 5/1979 | Johnson | 29/705 X |
| 4,366,947 | 1/1983 | Voege | 29/525 X |
| 4,607,421 | 8/1986 | Zemek et al. | 29/705 |
| 4,712,421 | 12/1987 | Young | 73/119 A |

*Primary Examiner*—Mark Rosenbaum
*Assistant Examiner*—S. Thomas Hughes
*Attorney, Agent, or Firm*—George L. Boller; Russel C. Wells

[57] ABSTRACT

A press metering device enables internal flow measurements to be made while press fitting components together. The press metering device comprises a press means for press fitting the components and a manifold for controlling flow path dimensions during the press fitting. The manifold has a first upper port and a second upper port for apportioning flow into a differential air flow gauge and metering the flow. A bottom port holds the components to be press fitted and may be sealed to the manifold by one or more o-rings.

2 Claims, 1 Drawing Sheet

PRESS METERING APPARATUS AND METHOD

FIELD OF THE INVENTION

This invention relates generally to fuel injectors of the type that are used to inject liquid fuel into the induction system of an internal combustion engine and having an atomizer that fits over the tip end of the injector to promote the atomization of the liquid fuel emitted by the fuel injector, and particularly to a manifold press metering device and method for press fitting the atomizer to the fuel injector.

BACKGROUND OF THE INVENTION

Air assist atomization of the liquid fuel emitted from the tip end of a fuel injector is a known technique that is used to promote better preparation of the combustible air/fuel mixture that is introduced into the combustion chambers of an internal combustion engine. A better mixture preparation promotes both a cleaner and a more efficient combustion process, a desirable goal from the standpoint of both exhaust emissions and fuel economy.

The state of the art contains a substantial number of patents relating to air assist atomization technology. The technology recognizes the benefits that can be gained by the inclusion of special assist air passages that direct the assist air into interaction with the injected liquid fuel. Certain air assist fuel injection systems use pressurized air, from either a pump or some other source of pressurization, as the assist air. Other systems rely on the pressure differential that exists between the atmosphere and the engine's induction system during certain conditions of engine operation. It is a common technique to mount the fuel injectors in an engine manifold or fuel rail which is constructed to include assist air passages for delivering the assist air to the individual injectors.

Prior techniques used to construct the air assist injector assemblage are tedious and imprecise. One technique requires pressing on a thimble, then pressing on an atomizer to an injector valve tip until the press bottoms out on the body. The injector was then removed from the press and placed onto an air flow test fixture to measure flow. If the flow was higher than the specification range, the injector was removed from the fixture and placed back on the press to crush down further. The procedure was repeated until the air flow was within the specifications. Obviously, this procedure is very time consuming, as well as very costly. Furthermore, an inadvertent overpress would force the injector to go below the specifications, rendering the injector unusable.

It is seen then that there exists a need for a manifold press tooling device which enables internal flow measurements to be made during the press fitting of the atomizer to the injector.

SUMMARY OF THE INVENTION

This need is met by the manifold press metering device of the present invention wherein an operator can press fit an air assist atomizer on an injector while accurately metering the internal flow rate during the press operation. The force required to fit the parts can be monitored, if desired, during the press fit operation for measurement repletion. The manifold press metering device of the present invention allows selection and control of flow rates by the precision of controlled press fitting the parts.

In accordance with one aspect of the present invention, a press metering device comprises a press means for press fitting components and a manifold for controlling flow path dimensions during the press fitting. The manifold preferably has a first upper port chamber and a second upper port chamber and apportions flow into a differential air flow gauge which meters the internal flow through the atomizer. A bottom port holds the components to be press fitted and may be sealed to the manifold by one or more o-rings.

The present invention also provides a method of press fitting components. The method comprises the steps of providing a press means for press fitting components and providing a manifold for controlling flow path dimensions during the press fitting. The step of providing the manifold further comprises the steps of apportioning flow into a differential air flow gage and metering the flow.

It is an advantage of the present invention that it eliminates the step of removing the injector from the press to measure air flow. This is accomplished by enabling the operator to accurately measure the internal air flow rate during the press operation. It is a feature of the present invention that it allows the selection and control of flow rates by the precision of controlled press fitting the atomizer to the injector.

For a full understanding of the nature and objects of the present invention, reference may be had to the following detailed description taken in conjunction with the accompanying drawings and the appended claims.

DESCRIPTION OF THE PREFERRED EMBODIMENT

The manifold press metering device of the present invention precisely controls flow path dimensions during the press fit of parts onto a component, such as an air assist injector. It is a function of the manifold press metering device to close in air channels sufficiently to maintain the desired internal dimensional flow.

Figure 1:
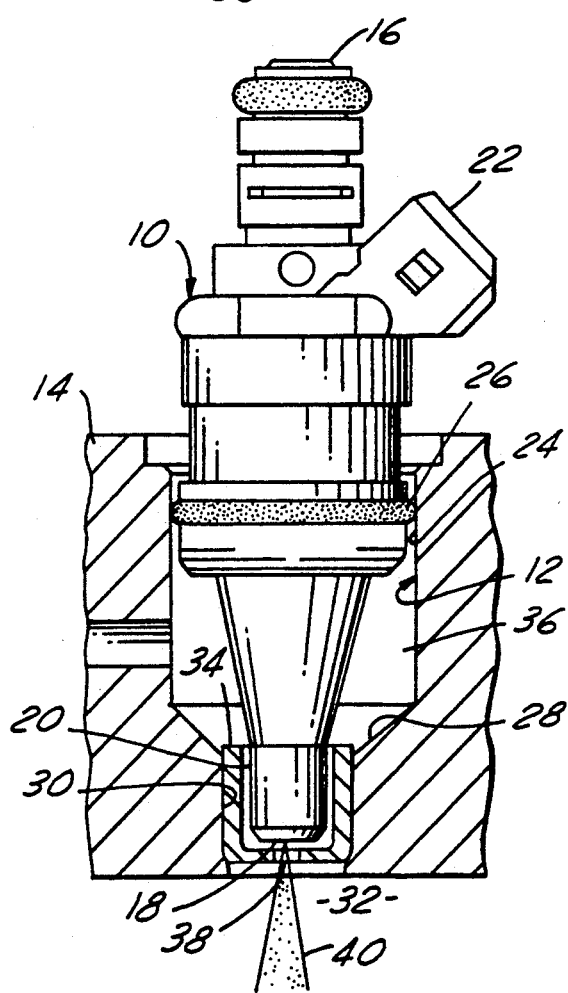
FIG. 1 is an elevational view partially in cross section through a manifold socket containing a fuel injector having an air assist atomizer.

Referring now to FIG. 1, there is shown, for purposes of description only, a top-feed, solenoid-operated fuel injector 10, which is typically mountable in a socket 12 of an engine manifold assembly 14. The engine also has a fuel rail (not shown) which is associated with the fuel injector 10 to deliver pressurized liquid fuel to the injector's fuel inlet 16 which is at one axial end of the injector 10.

Continuing with FIG. 1, any suitably shaped socket 12 may be used to accept a portion of the injector 10 that is adjacent the opposite axial end of the injector, including the injector's fuel outlet 18 which is at a tip end 20 of the injector 10. An electrical connector 22 of the injector 10 is shown as exterior of the socket 12 to be accessible for connection to a mating connector of a wiring harness (not shown) via which the injector's solenoid is operated from an electronic engine control.

Socket 12 is in the form of a through-bore which comprises a main circular cylindrical segment 24 to which the fuel injector 10 is sealed by means of a circular o-ring 26. The more interior portion of socket 12 comprises a frusto-conical segment 28 which tapers radially inwardly from segment 24 to a circular cylindrical segment 30 that is open to a main air induction passage 32 of the engine. Passage 32 leads to the engine's combustion chamber space (not shown), The injector's tip end 20 is fitted to segment 30 by means of an atomizer 34, which is typically thimble-shaped.

The manner in which the atomizer 34 functions can now be explained. When the engine is operating, the pressure in induction passage 32 is sub-atmospheric. Hence, a pressure difference exists across the atomizer 34, and this differential is effective to cause air from space 36 to pass axially through the atomizer and exit via an aperture 38 at the tip end of the atomizer 34, associated with the injector outlet 18 which sprays out a fuel spray 40. The air that passes through the atomizer 34 acts on the fuel spray 40 as it is being emitted from the injector tip end 20 to assist in the atomization of the liquid fuel entering induction passage 32.

Figure 2:
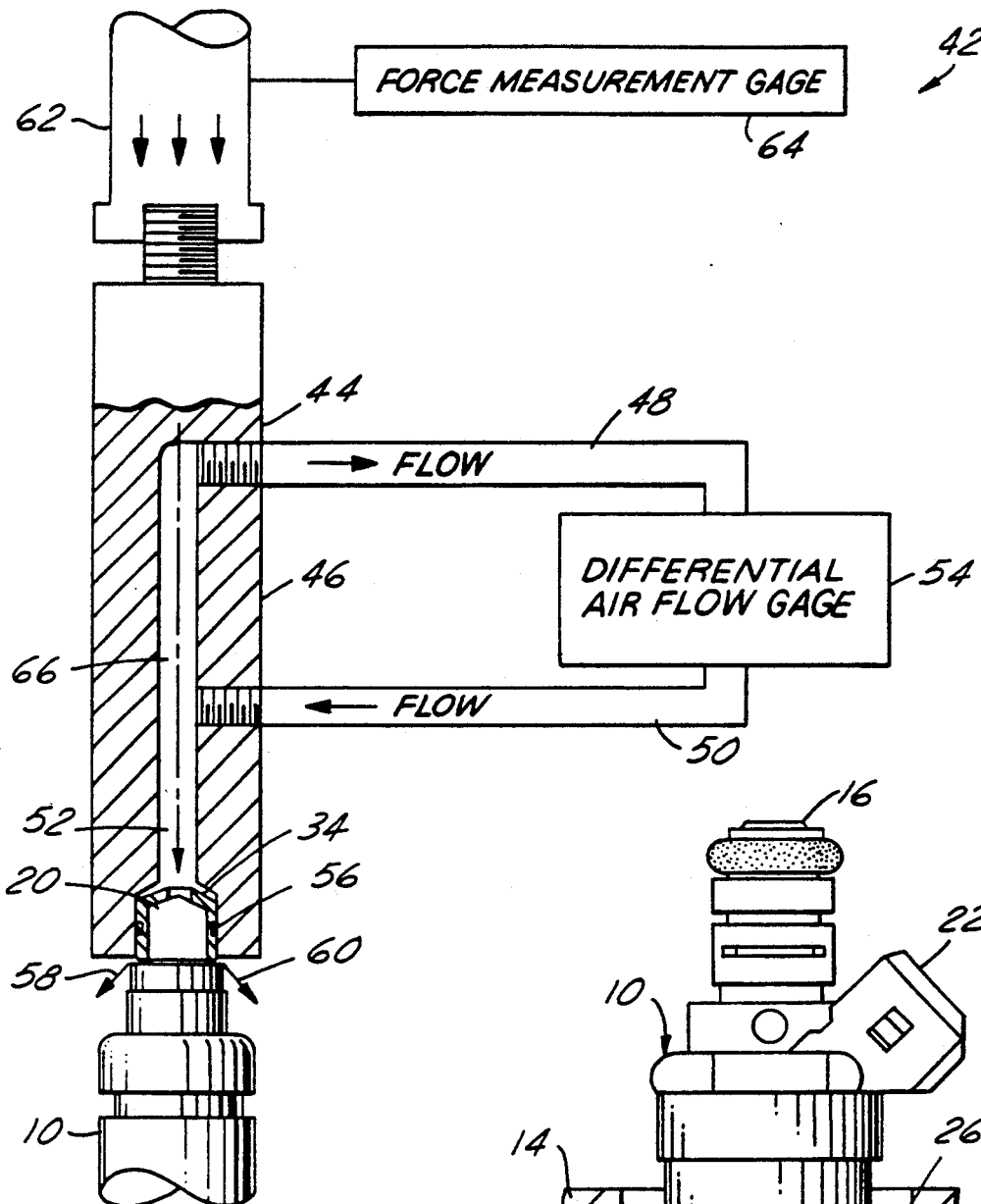
FIG. 2 is a view partially in cross section of a manifold press metering device of the present invention for press fitting the atomizer to the injector shown in FIG. 1.

Although it is desirable, then, to have an air assist injector, it has heretofore been very tedious and imprecise to attach the atomizer 34 to the injector 10. Referring now to FIG. 2 there is illustrated in cross section, a manifold press metering device 42 for producing metered air flow for a component, such as the air assist injector 10. The manifold press metering device 42 precisely controls flow path dimensions during the press fit of the atomizer 34 to the injector 10.

In FIG. 2, the manifold press metering device 42 comprises a manifold 44 having a multi-port chamber 46. The multi-port chamber 46 is preferably comprised of three ports 48, 50, and 52. Manifold 44 comprises a first upper port chamber 48 and a second upper port chamber 50 and apportions flow into a differential air flow gage 54 where the flow to atomizer 34 is metered. A bottom chamber 52 holds the injector 10 and the atomizer 34 which is sealed to the manifold 44 by one or more o-rings 56. Air flows from the bottom chamber 52 into the atomizer aperture 38, between the inside diameter of the atomizer 34 and the outside of the injector 10, and out flow orifices designated by arrows 58 and 60. The difference between the flow out of and the flow into the differential air flow gage 54 indicates the air flow at the flow orifices. The atomizer 34 is continued to be press fit to the injector 10 until the desired differential across the gage 54 is achieved, indicating that the desired press fit of the atomizer 34 to the injector 10 has been achieved.

Continuing with FIG. 2, the manifold press metering device 42 further comprises a press 62 to apply force to the manifold 44, causing the atomizer 34 to be press fit to the injector 10. A force measurement gage 64 may be used to measure the force used in pressing the components 34 and 10 together. The manifold press metering device 42 can precisely control flow path dimensions during the press fit of the atomizer 34 to the injector 10.

The flow of the stream into the manifold 44 to the atomizer 34 is reverse in relationship to the air flow of the injector 10. The injector 10 air flow is oriented from the atomizer 34 towards a center orifice 66 of the manifold 44. By reversing the direction of flow to the injector 10, it is possible to make internal flow measurements while pressing the atomizer 34 and the injector 10 together.

Although the manifold press metering device of the present invention is described for use in precisely controlling flow path dimensions during the press fit of parts onto an air assist injector, it will be obvious to those skilled in the art, the manifold press metering device of the present invention could also be extended for use in related areas. For example, the manifold press metering device can be used in the preparation of solenoids and actuators for manufacture.

The press is also described as having the function of closing in air channels to maintain the desired internal dimensional flow. It will be obvious to those skilled in the art that the manifold press metering device of the present invention could provide a variety of other functions as well. For example, the press may also be used to pinpoint internal dimensional flow measurements in inaccessible areas, and for precision setting of air gaps by flow measurement during pressing operations.

Having described the invention in detail and by reference to the preferred embodiment thereof, it will be apparent that other modifications and variations are possible without departing from the scope of the invention defined in the appended claims.

What is claimed is:

1. For obtaining a desired air flow through an atomizer of a fuel injector while the atomizer is being pressed onto a fuel-emitting nozzle of the fuel injector, said atomizer having an inlet via which atomizing air enters and an outlet via which atomized fuel exits, a press metering device comprising:
    means for pressing the atomizer onto the nozzle;
    means for directing air flow via the pressing means to enter the atomizer via the latter's outlet and exit the atomizer via the latter's inlet while the atomizer is being pressed onto the nozzle by the pressing means;
    and means for continuing the pressing until a desired air flow is obtained.

2. For obtaining a desired air flow through an atomizer of a fuel injector while the atomizer is being pressed onto a fuel-emitting nozzle of the fuel injector, said atomizer having an inlet via which atomizing air enters and an outlet via which atomized fuel exits, a press metering method comprising:
    pressing the atomizer onto the nozzle by a pressing means;
    directing air flow via the pressing means to enter the atomizer via the latter's outlet and exit the atomizer via the latter's inlet while the atomizer is being pressed onto the nozzle by the pressing means;
    and continuing the pressing until a desired air flow is obtained.

* * * * *